United States Patent
Hannum et al.

(10) Patent No.: US 7,600,023 B2
(45) Date of Patent: Oct. 6, 2009

(54) SYSTEMS AND METHODS OF BALANCING CROSSBAR BANDWIDTH

(75) Inventors: David Paul Hannum, Fort Collins, CO (US); Ronald Gregory Pichel, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 833 days.

(21) Appl. No.: 10/982,658

(22) Filed: Nov. 5, 2004

(65) Prior Publication Data

US 2006/0101234 A1    May 11, 2006

(51) Int. Cl.
G06F 15/173 (2006.01)
(52) U.S. Cl. .......... 709/226; 709/248; 709/238
(58) Field of Classification Search .......... 711/150, 711/151; 709/224, 249; 712/11; 370/351, 370/395, 229, 389, 429, 503, 222; 710/317
See application file for complete search history.

(56) References Cited

U.S. PATENT DOCUMENTS

| | | | |
|---|---|---|---|
| 5,179,669 A | | 1/1993 | Peters |
| 5,202,970 A | | 4/1993 | Schiffleger |
| 5,559,970 A | | 9/1996 | Sharma |
| 5,761,695 A | | 6/1998 | Maeda et al. |
| 5,930,822 A | | 7/1999 | Chaney et al. |
| 5,959,995 A | * | 9/1999 | Wicki et al. .......... 370/400 |
| 6,038,630 A | * | 3/2000 | Foster et al. .......... 710/317 |
| 6,061,345 A | * | 5/2000 | Hahn et al. .......... 370/351 |
| 6,072,772 A | * | 6/2000 | Charny et al. .......... 370/229 |
| 6,151,644 A | * | 11/2000 | Wu .......... 710/52 |
| 6,208,667 B1 | * | 3/2001 | Caldara et al. .......... 370/503 |
| 6,353,876 B1 | * | 3/2002 | Goodwin et al. .......... 711/143 |
| 6,704,312 B1 | * | 3/2004 | Chang et al. .......... 370/389 |
| 6,707,815 B1 | * | 3/2004 | Suzuki .......... 370/389 |
| 6,728,212 B1 | * | 4/2004 | Tancevski .......... 370/235 |
| 6,751,698 B1 | * | 6/2004 | Deneroff et al. .......... 710/317 |
| 6,763,418 B1 | * | 7/2004 | Chou et al. .......... 710/317 |
| 6,952,419 B1 | * | 10/2005 | Cassiday et al. .......... 370/392 |
| 7,142,555 B2 | * | 11/2006 | Wang .......... 370/429 |
| 7,170,903 B2 | * | 1/2007 | Alasti et al. .......... 370/414 |
| 7,227,841 B2 | * | 6/2007 | Mullendore et al. .......... 370/230 |
| 7,310,332 B2 | * | 12/2007 | Kadambi et al. .......... 370/360 |
| 2002/0101876 A1 | * | 8/2002 | Sonnier .......... 370/411 |
| 2002/0154625 A1 | * | 10/2002 | Ma .......... 370/351 |
| 2003/0206556 A1 | * | 11/2003 | Garcia et al. .......... 370/474 |
| 2004/0062244 A1 | * | 4/2004 | Gil et al. .......... 370/392 |
| 2004/0196859 A1 | | 10/2004 | Benner |
| 2004/0225787 A1 | * | 11/2004 | Ma et al. .......... 710/260 |
| 2005/0030893 A1 | * | 2/2005 | Dropps et al. .......... 370/229 |

(Continued)

OTHER PUBLICATIONS

Shalan, et al., "DX-Gt: Memory Management and Crossbar Switch Generator for Multiprocessor System-on-a-Chip," Proceedings of SASIMI '03, pp. 357-364, Apr. 2003.

*Primary Examiner*—Salad Abdullahi
*Assistant Examiner*—Anthony Mejia

(57) ABSTRACT

Systems and methods of balancing crossbar bandwidth in a multiprocessing system are disclosed. In an exemplary embodiment a system may comprise a crossbar switch having a plurality of links to processors in the multiprocessing system. A plurality of synchronizers is provided to receive micropackets from the links. At least one wait register holds the micropackets. An arbitrator is operatively associated with the at least one wait register, the arbitrator determining which micropackets are output from the crossbar if a threshold is satisfied.

14 Claims, 5 Drawing Sheets

U.S. PATENT DOCUMENTS

2005/0154806 A1*  7/2005  Adkisson et al. .............. 710/52
2005/0207436 A1*  9/2005  Varma ........................ 370/412
2006/0088049 A1*  4/2006  Kastein et al. .............. 370/462

* cited by examiner

SYSTEMS AND METHODS OF BALANCING CROSSBAR BANDWIDTH

TECHNICAL FIELD

The described subject matter relates to multiprocessing systems, and more particularly to systems and methods of balancing crossbar bandwidth in multiprocessing systems.

BACKGROUND

Multiprocessing systems with multiple shared resources are becoming increasingly commonplace. Such multiprocessing systems include, e.g., symmetric multiprocessing (SMP) chip fabrics having multiple processing units or processors and shared memory. A crossbar switch links the multiple processors to the shared memory. Firmware and/or circuitry in the crossbar switch arbitrates access to the shared memory.

Crossbar links may operate at a variety of different frequencies, e.g., based on the different clock speeds of the processors. The crossbar links are often synchronized so that the faster links do not always override the slower links when arbitrating for access to the shared memory.

The crossbar switch has to route an entire data packet before allowing other packets to arbitrate. Therefore, one method for synchronizing the links in a crossbar switch is to introduce invalid micropackets or "bubbles" into data packets coming from the slower processors. The bubbles serve as placeholders keeping the crossbar from switching to data packets arriving from the faster processors. However, introducing bubbles into data packets increases the latency of all packets through the crossbar, decreasing overall performance of the multiprocessing system.

SUMMARY

Balancing crossbar bandwidth in a multiprocessing system may be implemented in a system. An exemplary system may comprise a crossbar switch having a plurality of links to processors in the multiprocessing system. A plurality of synchronizers is provided to receive micropackets from the links. At least one wait register holds the micropackets. An arbitrator is operatively associated with the at least one wait register, the arbitrator determining which micropackets are output from the crossbar if a threshold is satisfied.

In another exemplary embodiment, balancing crossbar bandwidth in a multiprocessing system may be implemented as a method comprising: receiving a data packet as a plurality of micropackets at a crossbar switch, writing valid micropackets to a wait register until a threshold is satisfied and arbitrating for output from the crossbar switch if the threshold is satisfied.

DETAILED DESCRIPTION

Briefly, balancing crossbar bandwidth in a multiprocessing system may be implemented as a programmable hardware structure. Program code (e.g., firmware) determines on a per link basis how many valid micropackets need to be present before a data packet is allowed to arbitrate. Data packets arriving from slow links may be held in a wait register until more valid micropackets are received at the crossbar switch before being allowed to arbitrate. Data packets arriving from faster links may be allowed to arbitrate with fewer micropackets. Accordingly, invalid micropackets (or "bubbles") that may be injected into data packet are suppressed and the average time to output a data packet at the crossbar switch is reduced, enhancing overall performance of the multiprocessing system.

In an exemplary embodiment, existing queues may be used to reduce the need for additional hardware. In addition, program code controls the threshold packet size for allowing arbitration of a data packet, and the threshold packet size may be "tuned" for each link over time, e.g., based on performance statistics and changing speeds for different links.

Exemplary System

Figure 1:
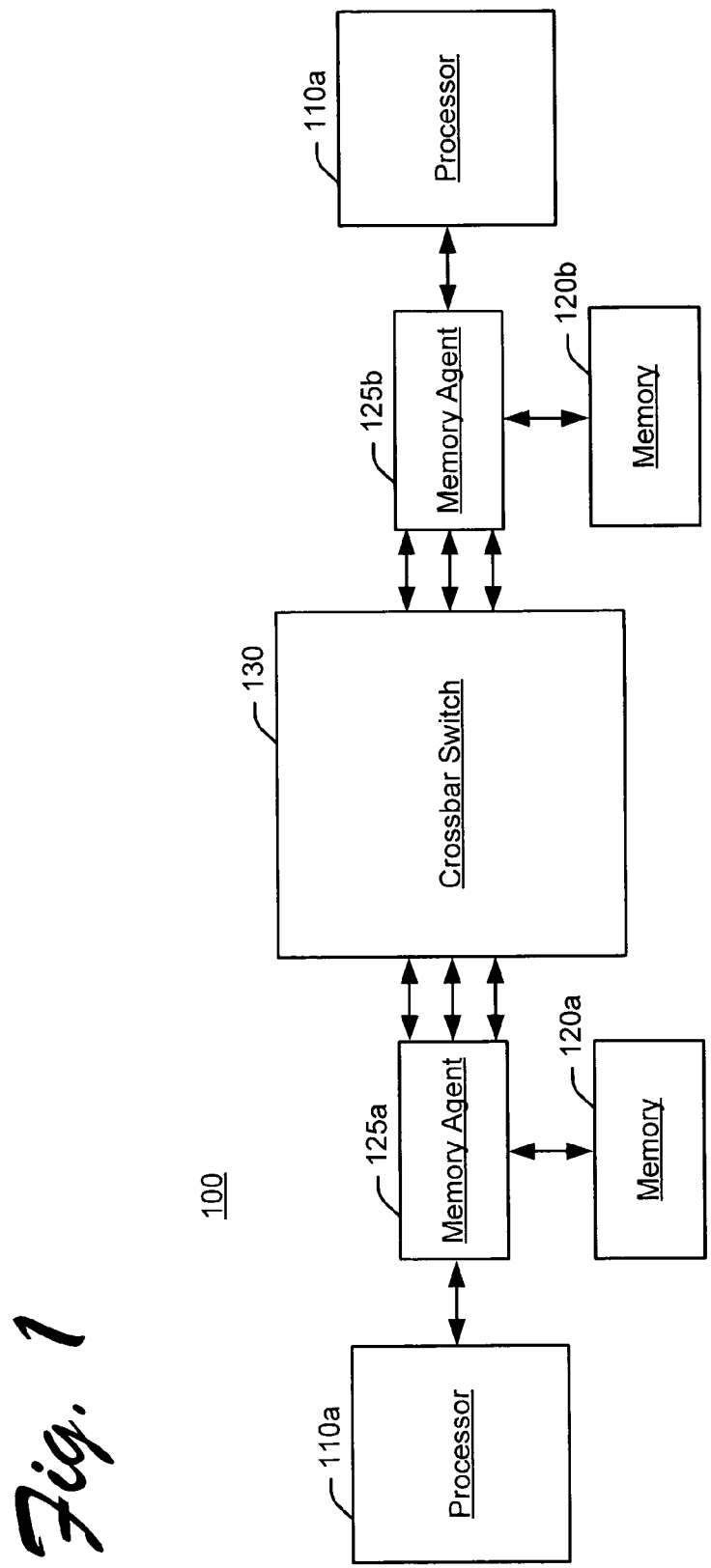
FIG. 1 is a high level schematic diagram of an exemplary multiprocessing system.

FIG. 1 is a high level schematic diagram of an exemplary multiprocessing system 100, such as, e.g., a symmetric multiprocessing (SMP) chip fabric. The multiprocessing system 100 may include a plurality of processing units or processors 110a-b and memory resources 120a-b (generally referred to herein as processors 110 and memory resources 120). A crossbar switch 130 may be provided to connect the processors 110 to the shared memory resources 120. Memory agents 125a-b may manage access to the memory resources 120.

Generally, a crossbar switch 130 may include circuitry and program code (e.g., firmware) to connect a plurality of processors 110 to one or more of the shared memory resources 120. Any of the processors 110 may connect via a direct link through the crossbar switch 130 to any of the memory resources 120. Although all of the processors 110 may simultaneously connect to separate memory resources 120, no two or more processors 110 may connect to a single memory resource 120 at the same time. If two or more processors (e.g., processor 110a and processor 110b) are seeking access to the same memory resource (e.g., memory resource 120a), an arbitrator determines which request has priority and makes a connection between that processor (e.g., processor 110b) and the requested memory resource 120a.

It is noted that although there are no theoretical limits on the number of processors 110 and memory resources 120 that can be included in a multiprocessing system 100, the number of processors 110 and memory resources 120 are limited primarily by the connectivity implemented in the switching fabric. It is also noted that the multiprocessing system 100 may include more than one crossbar switch 130.

Figure 2A:
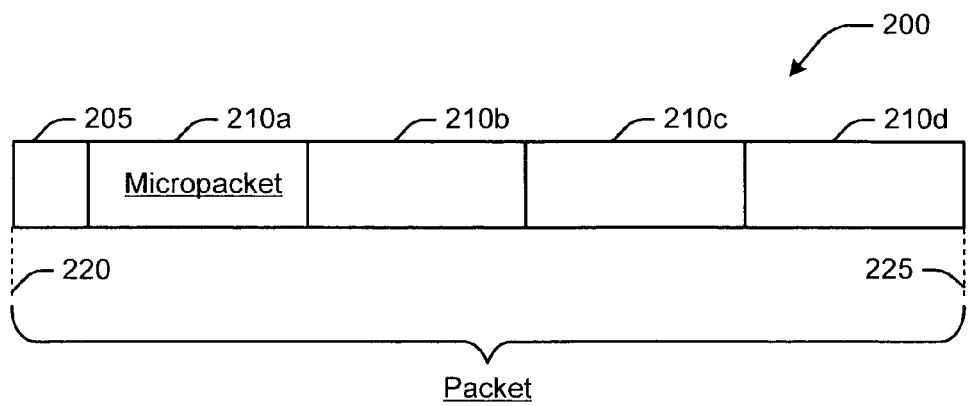
FIGS. 2a-c are high level illustrations of exemplary data packets.
Figure 2B:
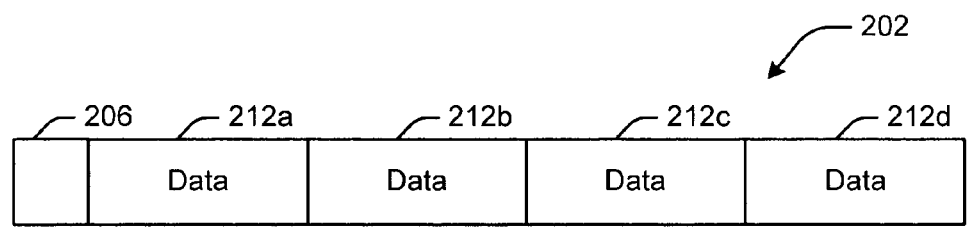
Figure 2C:
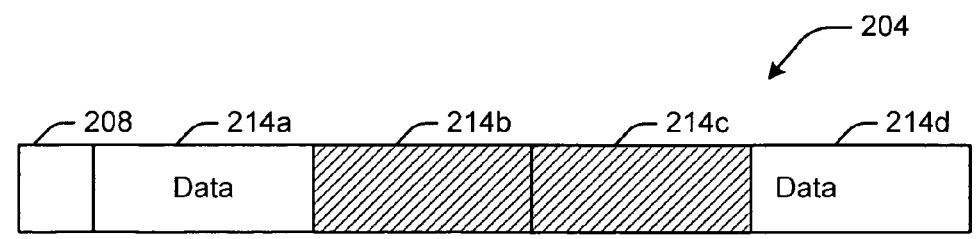

FIGS. 2a-c are high level illustrations of exemplary data packets. FIG. 2a shows a generalized data packet 200 including a header 205. Header 205 may include information about the corresponding data packet 200. For example, header data may include, but is not limited to, the packet type (e.g., a read request, a request to open a cache line, a data transfer packet) and packet length.

Data packet 200 may also include one or more micropackets 210a-d between packet boundaries 220, 225. Micropackets 210a-d may carry data and/or instructions (e.g., to retrieve and/or modify data in memory). In an exemplary embodiment, crossbar switch (e.g., the crossbar switch 130 in FIG. 1) switches between packet boundaries 220, 225. That is, the crossbar switch passes all of the micropackets 210a-d between the boundaries 220, 225 of the data packet 200 before handling another data packet for the same memory resource.

FIG. 2b illustrates another exemplary data packet 202 including header 206 and valid micropackets 212a-d. Valid micropackets 212a-d may carry valid data (e.g., instructions or cache data). Data packets 202 which include all valid micropackets 212a-d may be issued by faster processors that do not need to inject invalid micropackets into the data packet 202.

FIG. 2c illustrates another exemplary data packet 204 including header 208 in addition to both valid micropackets 214a, 214d and null or invalid micropackets 214b, 214c. As discussed above, the crossbar links may be synchronized by introducing invalid micropackets or "bubbles" into data packets coming from the slower processors. These invalid micropackets 214b, 214c may serve as "placeholders" in the data packet 204 so that the crossbar switch does not switch to another link before receiving all of the valid micropackets 214a, 214d for the data packet 204.

Figure 3:
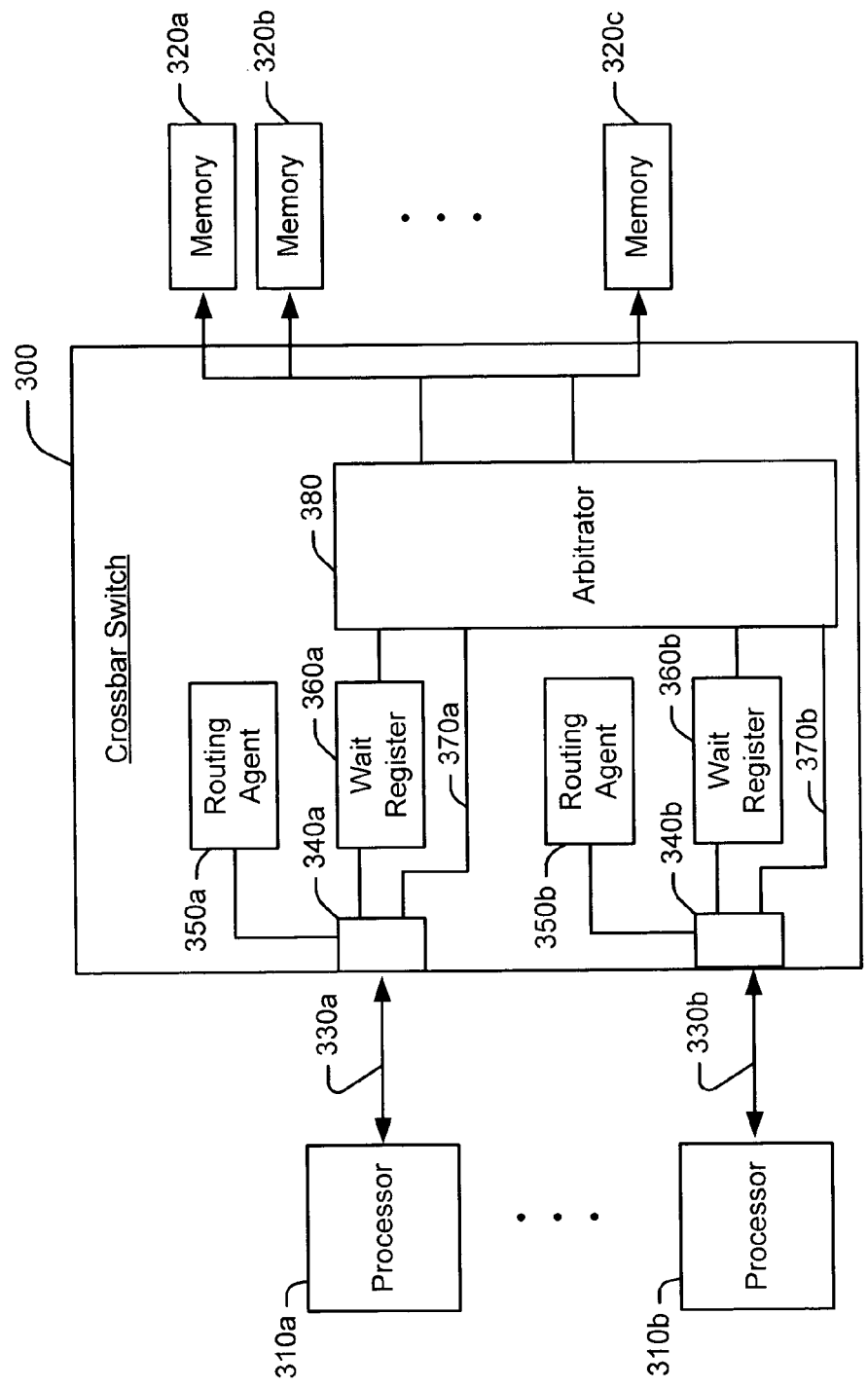
FIG. 3 is a schematic diagram of an exemplary crossbar switch that may be implemented in a multiprocessing system.

FIG. 3 is a detailed schematic diagram of an exemplary crossbar switch 300 as it may be implemented in a multiprocessing system (e.g., the multiprocessing system 100 shown in FIG. 1) to connect a plurality of processing units or processors 310a-b to shared memory resources 320a-c.

Crossbar switch 300 may include synchronizers 340a, 340b. Although only two synchronizers 340a, 340b are shown in FIG. 3 for purposes of simplicity, it is noted that crossbar switch 300 may include any number of synchronizers (generally referred to herein as synchronizers 340).

Synchronizers 340 are configured to receive data packets (e.g., data packets 200 in FIG. 2a) at the link speed of the respective processors 310. Synchronizers 340 may convert the received data packets to higher speeds for the crossbar switch 300 by periodically inserting "bubbles."

Crossbar switch 300 may also include wait registers 360a, 360b (hereinafter generally referred to as wait registers 360). Wait register 360 may be implemented as a firmware writable register, such as, e.g., a programmable i_wait_state register. In an exemplary embodiment, wait registers may be implemented in existing crossbar hardware, such as, e.g., the input queues. Wait registers 360 may be encoded for each possible number of valid micropackets in a maximum length data packet that is expected to be received over the link 330a. Wait register 360 may also be constructed so that the wait register 360 does not accept invalid micropackets.

Routing agents 350a, 350b (hereinafter generally referred to as routing agents 350) are operatively associated with synchronizers 340 to handle data packets. Routing agent 350 may be implemented as program code (e.g., firmware). An exemplary routing agent 350 is described in more detail below with reference to FIG. 4. For now it is enough to understand that routing agent 350 may include logic instructions for loading micropackets into the wait registers 360 until a threshold number (e.g., all) of the valid micropackets for a data packet are received at the crossbar switch 300.

In an exemplary embodiment, data packets in the wait register 360 are not allowed to arbitrate for output from the crossbar switch 300 until a threshold number (e.g., all) of the micropackets for the data packet are present. Accordingly, the data packet has to wait until all valid micropackets are present at the crossbar switch 300.

In some circumstances, the data packet received at the crossbar switch may include more micropackets than may be written to the wait register 360. Accordingly, the data packet is held in the wait register 360 at least until the number of valid micropackets specified for the wait register 360 are collected before the data packet is allowed to arbitrate.

When a data packet loses arbitration, it takes some time (t) to request the processor 310 stop sending new data packets. Accordingly, the wait registers 360 may be configured with enough queue capacity to store micropackets that are already "in-flight" from the processor 310. In addition, invalid micropackets or "bubbles" are not inserted into the wait registers 360. The wait register delays arbitration so that fewer bubbles are routed through the crossbar switch 300.

Bypass paths 370a, 370b (hereinafter generally referred to as bypass path 370) may also be provided around wait registers 360. In an exemplary embodiment routing agent 350 may route micropackets around the wait register 360 via bypass path 370 if the input queue 340 is empty and the link 330 has won arbitration for outputting a data packet. If both of these conditions are satisfied both valid and invalid micropackets may be bypassed around wait register 360 to enhance overall performance of the multiprocessing system. However, routing both valid and invalid micropackets may slow operation of the crossbar switch 300, and therefore the data packet from the wait register is generally selected for arbitration before allowing a bypass.

Figure 4:
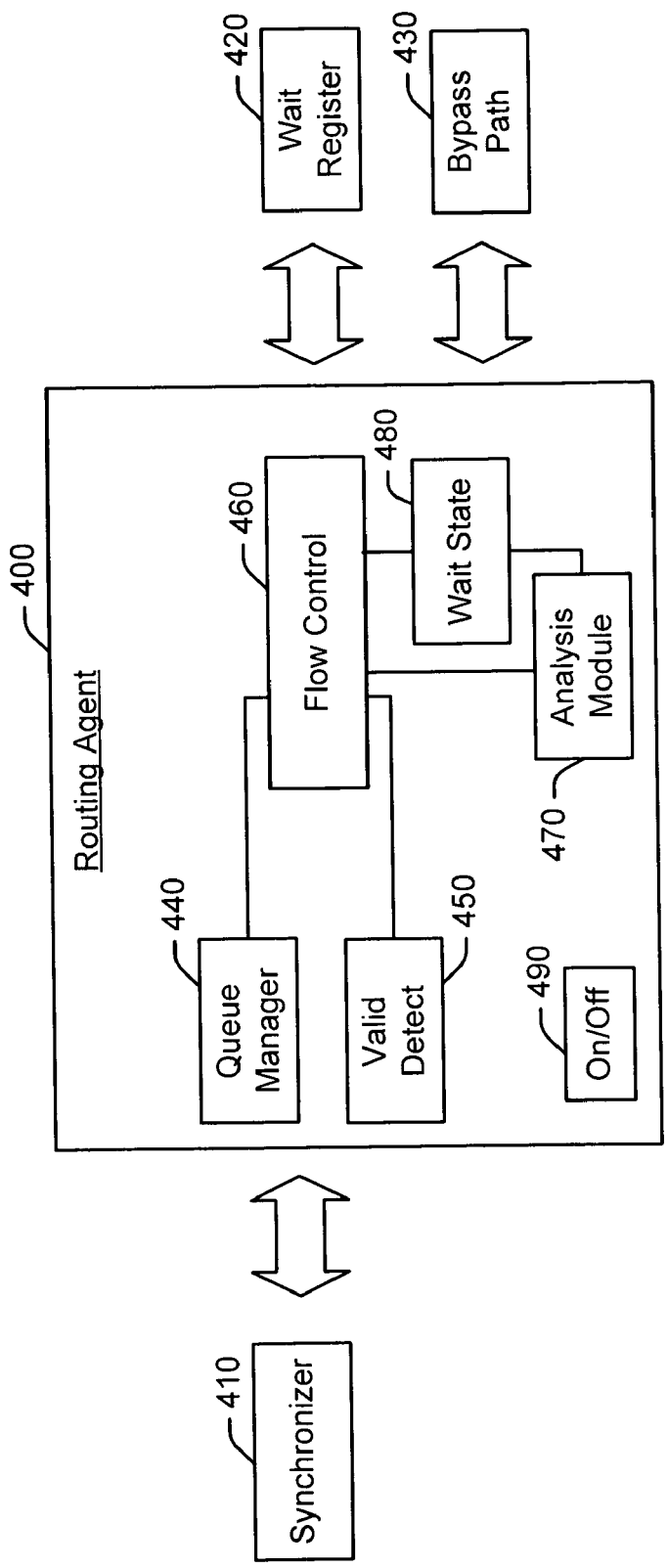
FIG. 4 is a schematic diagram of an exemplary routing agent that may be implemented in a crossbar switch.

FIG. 4 is a schematic diagram of an exemplary routing agent 400 that may be implemented in a crossbar switch (such as the crossbar switch 300 in FIG. 3). Routing agent 400 is communicatively coupled to synchronizer 410 for receiving data packets at the crossbar switch. Routing agent 400 may also be operatively associated with a wait register 420 and a bypass path 430.

Routing agent 400 may be implemented as program code (e.g., firmware) including logic instructions executable to balance crossbar bandwidth in a multiprocessing system. The logic instructions may be encoded as functional modules. Exemplary functional modules may include a queue manager 440, a valid detect module 450, a flow control module 460, and an analysis module 470.

Queue manager 440 may be provided to monitor the synchronizer 410, e.g., to determine when a data packet is received, to read the header and determine packet boundaries, etc. Queue manager 440 may also monitor the synchronizer 410 to determine whether it is empty.

Valid detect module 450 may be provided to determine whether a micropacket received at the crossbar switch is valid or invalid. Valid detect module 450 may evaluate micropackets based on the packet header. In an exemplary embodiment, only valid micropackets are written to the wait register 420. Invalid micropackets may be rejected by the valid detect module 450.

Queue manager 440 and valid detect module 450 may be operatively associated with the flow control module 460. Flow control module 460 determines whether to write micropackets to the wait register 420 or bypass wait register 420 via bypass path 430 based on determinations made by the queue manager 440 and valid detect module 450.

In an exemplary embodiment flow control module 460 may route micropackets around wait register 420 via bypass path 430 if the wait register is empty and the link has won arbitration for outputting a data packet. If flow control module 460 routes micropackets around the wait register 420 both valid and invalid micropackets may bypass wait register 420.

In another exemplary embodiment, flow control module 460 may hold valid micropackets in wait register 420 until all valid micropackets for a data packet are received at the crossbar switch. Flow control module 460 may be operatively associated with a wait state module 480 for determining how long a data packet should be made to wait in the wait register 420 before being issued to the arbitrator for output from the crossbar switch.

Wait state module 480 may be implemented, e.g., as a data structure including a number of data fields as illustrated in Table 1.

TABLE 1

Exemplary Wait State Module

| Field | Contents |
|---|---|
| Flow Control Class | Read Request, Open Cache Line, . . . |
| Wait Length | 1, 10, . . . |

In an exemplary embodiment, flow control module 460 determines the type or class of the data packet, e.g., based on information contained in the header of the data packet. Flow control module 460 may then access the wait state module 480 to determine how many valid micropackets need to be received at the crossbar switch before the data packet is allowed to arbitrate. Alternatively, the wait length may be expressed in terms of clock cycles.

Generally, data packets received at the slower link should be made to wait until more valid micropackets are received at the crossbar switch. For purposes of illustration, a data packet requesting a read operation may be allowed to arbitrate when the first valid micropacket is received. Accordingly, the processor begins receiving data from the memory resource without having to wait for other more lengthy operations to finish. On the other hand, a data packet requesting to open a cache line may be written to the wait register, e.g., until at least ten valid micropackets are received at the crossbar switch. Accordingly, other operations are not hindered by a cache line having a large number of micropackets to transfer.

The wait state module 480 may be populated, e.g., at startup based on default conditions and/or by the analysis module 470 during operation. Default conditions may include expected delays based on processor speeds (e.g., using models or actual test data). During operation, analysis module 470 may reconfigure and optimize the wait length for various flow control classes. For example, analysis module 470 may apply a heuristic approach to evaluate feedback based on actual performance of the link to increase or decrease the wait length for different flow control classes to improve overall performance of the multiprocessing system.

Routing agent 400 may also be deactivated for one or more links of the crossbar switch, e.g., as indicated by on/off logic 490 in FIG. 4. In an exemplary embodiment routing agent 400 may be deactivated for links servicing faster processors which inject fewer (or no) invalid micropackets into the data packets.

It is noted that exemplary routing agent 400 is shown and described herein for purposes of illustration and is not intended to be limiting. For example, queue manager 440, valid detect module 450, flow control module 460, and analysis module 470 do not need to be encapsulated as separate functional components. In addition, other functional components may also be provided and are not limited to those shown and described herein.

It is noted that the exemplary systems discussed above are provided for purposes of illustration. Still other implementations are also contemplated.

Exemplary Operations

Figure 5:
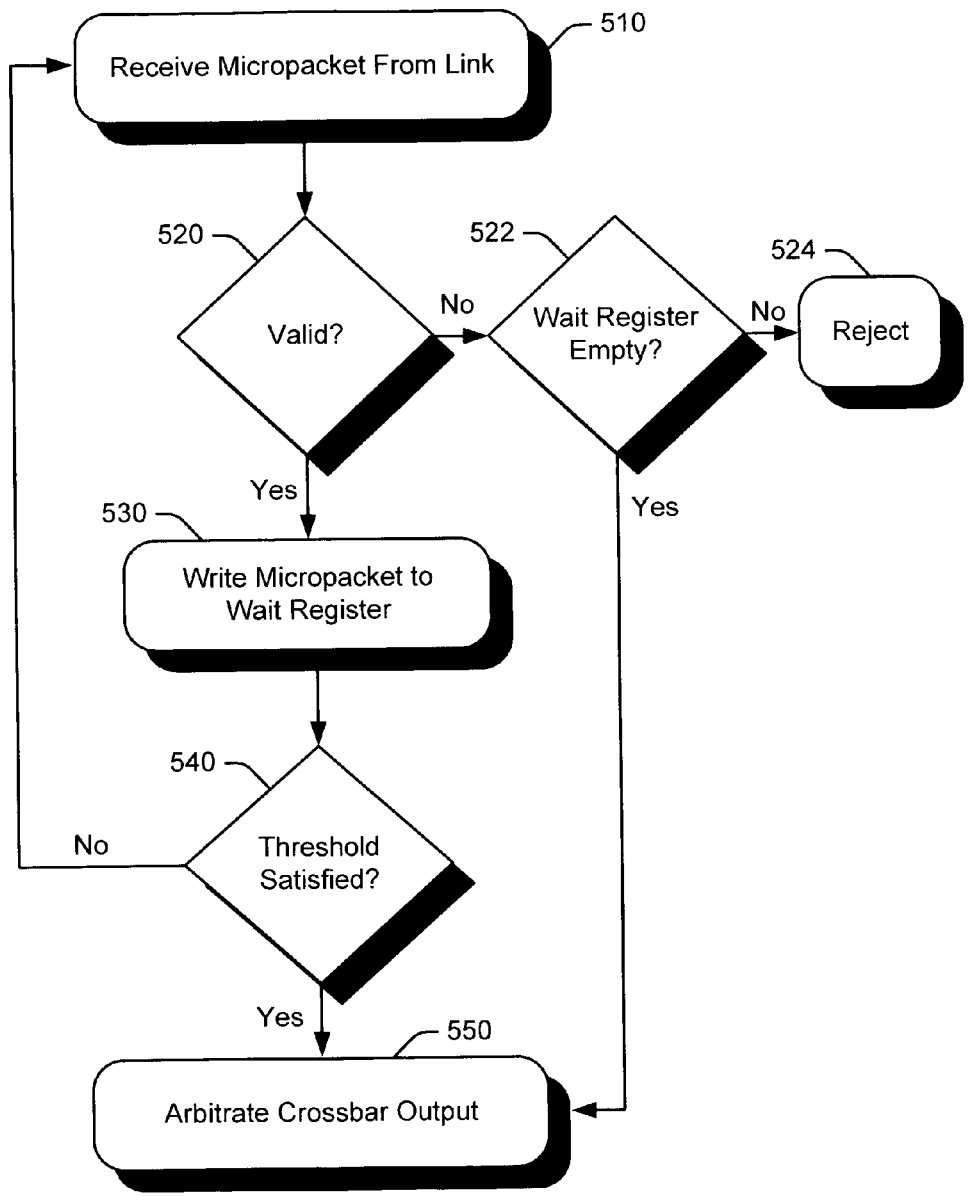
FIG. 5 is a flowchart illustrating exemplary operations of balancing crossbar bandwidth in a multiprocessing system.

FIG. 5 is a flowchart illustrating exemplary operations of balancing crossbar bandwidth in a multiprocessing system. Operations 500 may be embodied as logic instructions on one or more computer-readable medium. When executed the logic instructions cause processing units or processors to be programmed for implementing the described operations. In an exemplary embodiment, the components and connections depicted in the figures may be used to balance crossbar bandwidth in a multiprocessing system.

In operation 510, micropackets are received at a crossbar switch. In operation 520, a determination is made whether the micropacket is valid or invalid. If the micropacket is valid the micropacket may be written to a wait register in operation 530. In operation 540, another determination is made whether the threshold number of micropackets for the data packet are present. For example, the threshold may be determined by the flow control class for the data packet and may require that all data packets be present or the wait register be full. If the threshold is satisfied the data packet is allowed to arbitrate for output from the crossbar switch in operation 550. Otherwise operations return to operation 510 to receive additional micropackets.

Returning to operation 520, if the micropacket is invalid another determination is made in operation 522 whether the wait register for the link is empty. If the wait register is not empty the invalid micropacket is rejected in operation 524. Alternatively, if the wait register is empty the packet is allowed to arbitrate for output from the crossbar switch in operation 550. If the data packet wins abritration, both valid and invalid micropackets may be bypassed around the wait register.

The operations shown and described herein are provided to illustrate exemplary embodiments of balancing crossbar bandwidth in multiprocessing systems. It is noted that the operations are not limited to the ordering shown and described. In addition, still other operations may also be implemented.

The invention claimed is:

1. A system for balancing crossbar bandwidth in a multiprocessing system, comprising:

a crossbar switch connected to shared memory resources, the crossbar switch having a plurality of links each to a plurality of processors in the multiprocessing system;

a plurality of synchronizers provided in the crossbar switch, the plurality of synchronizers configured to receive micropackets from the plurality of links, the plurality of synchronizers converting at least some of the received micropackets to higher speeds for the crossbar switch by inserting invalid micropackets;

at least one wait register in the crossbar switch, the at least one wait register encoded for each possible number of valid micropackets in a maximum length micropacket expected to be received over the plurality of links, the at least one wait register not accepting invalid micropackets;

a bypass path around the at least one wait register;

an arbitrator operatively associated with the at least one wait register and the bypass path, the arbitrator determining which micropackets are output from the crossbar switch only if a threshold is satisfied; and a routing agent operatively associated with the at least one wait register and the bypass path, the routing agent writing only valid micropackets to the wait register, the routing agent routing both valid and invalid micropackets past the wait register if the wait register is empty and the threshold is satisfied.

2. The system of claim 1 further comprising the routing agent routing micropackets around the wait register if the wait register for the link is empty and the link wins arbitration.

3. The system of claim 1 wherein the threshold is different for different flow control classes.

4. The system of claim 1 further comprising an analysis module to evaluate the threshold during operation of the crossbar switch and change the threshold based on performance of the crossbar switch.

5. The system of claim 1 wherein the threshold is satisfied if all valid micropackets for a data packet are received at the crossbar switch.

6. The system of claim 1 wherein the threshold is satisfied if the wait register is full.

7. The system of claim 1 wherein the at least one wait register is a firmware writable i_wait_state register.

8. A method of balancing crossbar bandwidth in a multi-processing system comprising:
   receiving a data packet as a plurality of micropackets at a crossbar switch;
   writing only valid micropackets to a wait register until a threshold is satisfied; and
   arbitrating for output from the crossbar switch if the threshold is satisfied.

9. The method of claim 8 further comprising suppressing invalid micropackets received at the crossbar switch.

10. The method of claim 8 further comprising satisfying the threshold if all valid micropackets for the data packet are received at the crossbar switch.

11. The method of claim 8 further comprising satisfying the threshold if the wait register is full.

12. The method of claim 8 further comprising changing the threshold based on performance of the crossbar switch.

13. The method of claim 8 further comprising bypassing the wait register if the wait register is empty and the input queue has won arbitration.

14. The method of claim 13 wherein both valid and invalid micropackets bypass the wait register.

* * * * *